United States Patent
Hoehne et al.

(10) Patent No.: US 7,669,906 B2
(45) Date of Patent: Mar. 2, 2010

(54) RUNNING PROFILE OF RAILWAY WHEEL

(75) Inventors: Wolfram Hoehne, Hamburg (DE); Alfred Lohmann, Siegen (DE); Jani Dede, Siegen (DE); Mario Rettig, Netphen (DE); Johannes Stephanides, Vienna (AT)

(73) Assignee: Bombardier Transportation GmbH, Berlin (DE)

(*) Notice: Subject to any disclaimer, the term of this patent is extended or adjusted under 35 U.S.C. 154(b) by 658 days.

(21) Appl. No.: 10/574,327

(22) PCT Filed: Oct. 4, 2004

(86) PCT No.: PCT/EP2004/011046

§ 371 (c)(1),
(2), (4) Date: Mar. 13, 2007

(87) PCT Pub. No.: WO2005/032852

PCT Pub. Date: Apr. 14, 2005

(65) Prior Publication Data

US 2007/0252399 A1 Nov. 1, 2007

(30) Foreign Application Priority Data

Oct. 2, 2003 (DE) ............................ 103 46 020

(51) Int. Cl.
*B60B 17/00* (2006.01)

(52) U.S. Cl. ........................ 295/31.1; 295/34

(58) Field of Classification Search ............... 295/1, 295/8, 31.1, 34
See application file for complete search history.

(56) References Cited

U.S. PATENT DOCUMENTS

| 1,783,705 | A | * | 12/1930 | Emerson et al. | 295/34 |
| 4,294,482 | A | * | 10/1981 | Scheffel et al. | 295/34 |
| 5,549,343 | A | * | 8/1996 | Blazer | 295/34 |
| 2005/0104398 | A1 | * | 5/2005 | Nast | 295/34 |

FOREIGN PATENT DOCUMENTS

| DE | 862 458 | | 1/1953 |
| EP | 800 933 A2 | | 10/1997 |
| JP | 3-204302 | | 9/1991 |
| JP | 11-123902 | | 5/1999 |
| WO | WO 9008047 A1 | * | 7/1990 |

OTHER PUBLICATIONS

International Search Report in PCT/EP2004/011046 dated Feb. 14, 2005.

* cited by examiner

*Primary Examiner*—Russell D Stormer
(74) *Attorney, Agent, or Firm*—Marshall, Gerstein & Borun LLP

(57) ABSTRACT

Wheels for goods wagons with small and large diameters, in addition to wheel sets equipped with wheels of this type for running gear, which are dependent on a highly passive radial positioning when negotiating curves and must remain stable at high speed. The inventive wheel profile is characterized as a result of the relatively large entry radius into the transition area from the running surface to the wheel flange by a low equivalent conicity. This enables a quieter running of the wheel set when the latter is travelling in a straight line. In curves, there is a sufficient rolling circle differential, permitting less wear and tear.

16 Claims, 8 Drawing Sheets

| Pt. | X | Y | Pt. | X | Y | Pt. | X | Y |
|---|---|---|---|---|---|---|---|---|
| 0 | 0.000 | 0.000 | 7 | -16.208 | 1.046 | M1 | -49.5000 | 13.5910 |
| 1 | -70.000 | 13.591 | 8 | -4.255 | 0.212 | M2 | -55.0834 | 20.0000 |
| 2 | -62.966 | 29.048 | 9 | 30.000 | -1.499 | M3 | -58.0510 | 17.3140 |
| 3 | -55.000 | 32.000 | 10 | 60.000 | -4.493 | M4 | -26.4299 | 19.0772 |
| 4 | -43.562 | 21.196 | 11 | 65.000 | -9.493 | M5 | -8.7942 | 83.1745 |
| 5 | -41.885 | 14.936 | | | | M6 | 10.8580 | 302.8350 |
| 6 | -30.641 | 3.641 | | | | | | |

Fig. 2a

3% Deviation

| Pt. | X | Y | $X_{max}$ | $X_{min}$ | Delta X | $Y_{max}$ | $Y_{min}$ | Delta Y |
|---|---|---|---|---|---|---|---|---|
| 1 | -70.000 | 13.591 | -67.900 | -72.100 | 4.200 | 13.999 | 13.183 | 0.815 |
| 2 | -62.966 | 29.048 | -61.077 | -64.855 | 3.778 | 29.919 | 28.177 | 1.743 |
| 3 | -55.000 | 32.000 | -53.350 | -56.650 | 3.300 | 32.960 | 31.040 | 1.920 |
| 4 | -43.562 | 21.196 | -42.255 | -44.869 | 2.614 | 21.832 | 20.560 | 1.272 |
| 5 | -41.885 | 14.936 | -40.628 | -43.142 | 2.513 | 15.384 | 14.488 | 0.896 |
| 6 | -30.641 | 3.641 | -29.722 | -31.560 | 1.838 | 3.750 | 3.532 | 0.218 |
| 7 | -16.208 | 1.046 | -15.722 | -16.694 | 0.972 | 1.077 | 1.015 | 0.063 |
| 8 | -4.255 | 0.212 | -4.127 | -4.383 | 0.255 | 0.218 | 0.206 | 0.013 |
| 9 | 30.000 | -1.499 | 30.900 | 29.100 | 1.800 | -1.454 | -1.544 | 0.090 |
| 10 | 60.000 | -4.493 | 61.800 | 58.200 | 3.600 | -4.358 | -4.628 | 0.270 |
| 11 | 65.000 | -9.493 | 66.950 | 63.050 | 3.900 | -9.208 | -9.778 | 0.570 |

Fig. 2b

5% Deviation

| Pt. | X | Y | $X_{max}$ | $X_{min}$ | Delta X | $Y_{max}$ | $Y_{min}$ | Delta Y |
|---|---|---|---|---|---|---|---|---|
| 1 | -70.000 | 13.591 | -66.500 | -73.500 | 7.000 | 14.271 | 12.911 | 1.359 |
| 2 | -62.966 | 29.048 | -59.818 | -66.114 | 6.297 | 30.500 | 27.596 | 2.905 |
| 3 | -55.000 | 32.000 | -52.250 | -57.750 | 5.500 | 33.600 | 30.400 | 3.200 |
| 4 | -43.562 | 21.196 | -41.384 | -45.740 | 4.356 | 22.256 | 20.136 | 2.120 |
| 5 | -41.885 | 14.936 | -39.791 | -43.979 | 4.189 | 15.683 | 14.189 | 1.494 |
| 6 | -30.641 | 3.641 | -29.109 | -32.173 | 3.064 | 3.823 | 3.459 | 0.364 |
| 7 | -16.208 | 1.046 | -15.398 | -17.018 | 1.621 | 1.098 | 0.994 | 0.105 |
| 8 | -4.255 | 0.212 | -4.042 | -4.468 | 0.426 | 0.223 | 0.201 | 0.021 |
| 9 | 30.000 | -1.499 | 31.500 | 28.500 | 3.000 | -1.424 | -1.574 | 0.150 |
| 10 | 60.000 | -4.493 | 63.000 | 57.000 | 6.000 | -4.268 | -4.718 | 0.449 |
| 11 | 65.000 | -9.493 | 68.250 | 61.750 | 6.500 | -9.018 | -9.968 | 0.949 |

Fig. 2c

| Pt. | X | Y | Pt. | X | Y | Pt. | X | Y |
|---|---|---|---|---|---|---|---|---|
| 0 | 0.0000 | 0.0000 | 7 | -28.4507 | 3.5170 | M1 | -49.5000 | 9.5190 |
| 1 | -70.0000 | 9.5190 | 8 | -13.8679 | 0.9086 | M2 | -55.3618 | 16.9949 |
| 2 | -62.1491 | 25.6512 | 9 | -2.4655 | 0.1232 | M3 | -55.1642 | 12.9998 |
| 3 | -55.9052 | 27.9815 | 10 | 32.4994 | -1.6234 | M4 | -59.4374 | 10.4038 |
| 4 | -42.3444 | 20.7879 | 11 | 60.000 | -4.3680 | M5 | -23.9305 | 18.9527 |
| 5 | -40.6426 | 17.2415 | 12 | 65.000 | -9.3680 | M6 | -6.6036 | 83.5901 |
| 6 | -39.2751 | 13.4826 | | | | M7 | 12.6514 | 302.7580 |

Fig. 4a

3% Deviation

| Pt. | X | Y | $X_{max}$ | $X_{min}$ | Delta X | $Y_{max}$ | $Y_{min}$ | Delta Y |
|---|---|---|---|---|---|---|---|---|
| 1 | -70.0000 | 9.5190 | -67.900 | -72.100 | 4.200 | 9.805 | 9.233 | 0.571 |
| 2 | -62.1491 | 25.6512 | -60.285 | -64.014 | 3.729 | 26.421 | 24.882 | 1.539 |
| 3 | -55.9052 | 27.9815 | -54.228 | -57.582 | 3.354 | 28.821 | 27.142 | 1.679 |
| 4 | -42.3444 | 20.7879 | -41.074 | -43.615 | 2.541 | 21.412 | 20.164 | 1.247 |
| 5 | -40.6426 | 17.2415 | -39.423 | -41.862 | 2.439 | 17.759 | 16.724 | 1.034 |
| 6 | -39.2751 | 13.4826 | -38.097 | -40.453 | 2.357 | 13.887 | 13.078 | 0.809 |
| 7 | -28.4507 | 3.5170 | -27.597 | -29.304 | 1.707 | 3.623 | 3.411 | 0.211 |
| 8 | -13.8679 | 0.9086 | -13.452 | -14.284 | 0.832 | 0.936 | 0.881 | 0.055 |
| 9 | -2.4655 | 0.1232 | -2.392 | -2.539 | 0.148 | 0.127 | 0.120 | 0.007 |
| 10 | 32.4994 | -1.6234 | 33.474 | 31.524 | 1.950 | -1.575 | -1.672 | 0.097 |
| 11 | 60.000 | -4.3680 | 61.800 | 58.200 | 3.600 | -4.237 | -4.499 | 0.262 |
| 12 | 65.000 | -9.3680 | 66.950 | 63.050 | 3.900 | -9.087 | -9.649 | 0.562 |

Fig. 4b

5% Deviation

| Pt. | X | Y | $X_{max}$ | $X_{min}$ | Delta X | $Y_{max}$ | $Y_{min}$ | Delta Y |
|---|---|---|---|---|---|---|---|---|
| 1 | -70.0000 | 9.5190 | -66.500 | -73.500 | 7.000 | 9.995 | 9.043 | 0.952 |
| 2 | -62.1491 | 25.6512 | -59.042 | -65.257 | 6.215 | 26.934 | 24.369 | 2.565 |
| 3 | -55.9052 | 27.9815 | -53.110 | -58.700 | 5.591 | 29.381 | 26.582 | 2.798 |
| 4 | -42.3444 | 20.7879 | -40.227 | -44.462 | 4.234 | 21.827 | 19.749 | 2.079 |
| 5 | -40.6426 | 17.2415 | -38.610 | -42.675 | 4.064 | 18.104 | 16.379 | 1.724 |
| 6 | -39.2751 | 13.4826 | -37.311 | -41.239 | 3.928 | 14.157 | 12.808 | 1.348 |
| 7 | -28.4507 | 3.5170 | -27.028 | -29.873 | 2.845 | 3.693 | 3.341 | 0.352 |
| 8 | -13.8679 | 0.9086 | -13.175 | -14.561 | 1.387 | 0.954 | 0.863 | 0.091 |
| 9 | -2.4655 | 0.1232 | -2.342 | -2.589 | 0.247 | 0.129 | 0.117 | 0.012 |
| 10 | 32.4994 | -1.6234 | 34.124 | 30.874 | 3.250 | -1.542 | -1.705 | 0.162 |
| 11 | 60.000 | -4.3680 | 63.000 | 57.000 | 6.000 | -4.150 | -4.586 | 0.437 |
| 12 | 65.000 | -9.3680 | 68.250 | 61.750 | 6.500 | -8.900 | -9.836 | 0.937 |

RUNNING PROFILE OF RAILWAY WHEEL

BACKGROUND OF THE INVENTION

1. Field of the Invention

The invention relates to wheels for railway goods wagons of varying measuring circle diameters, and wheel sets for running gears having such wheels.

2. Description of Related Technology

UIC Instruction Sheet 510-2 VE, International Railway Union, Beuth-Verlag GmbH, 10787 Berlin, sets out the conditions for the construction and maintenance of wheels for passenger train and goods wagons used in international traffic. It covers wheel diameters from 330 to 1000 mm, and indicates for these the wheel set loads permissible in terms of the material loading of the wheel and rail. The profile of the wheel (running profile) is described in the UIC Instruction Sheet with reference to different areas. The running profile of the wheel exhibits an inner wheel rim or tire front face to which is connected the wheel flange. The flange of the running profile is described by the inner wheel flange flank, the top of the wheel flange and the outer wheel flange flank. The wheel flange passes into the groove of the running profile, to which is connected the running surface. This is followed by the inclination of the outer running surface section, the outer bevelling of the running profile and the outer wheel rim or tire front face. The running profile is further described by the wheel flange height, the wheel flange thickness, the wheel rim or tire width, the measuring circle diameter, the radii of the top of the wheel flange, the radius of the running profile groove and the angle of the outer wheel flange flank. The profile is always described in the solid coordinate system whose origin (y=0, z=0) lies in the measuring circle plane (750 mm from the central plane of the wheel set).

Reference is also made to the Decree concerning the Construction and Operation of Connecting Railways, in the wording of the corresponding Federal State BOA, the Railway Construction and Operating Order (EBO), the Railway Construction and Operating Order for Connecting Railways (model) (EBOA), the Regolamento Internazionale Carrozze (RIC) and the Regolamento Internazionale Veicoli (RIV).

There are different wheel profiles of prior art, examples of which include the wheel profile S1002 (UIC 510-1), which is commonly used in bogies for goods wagons with wheel sets of normal size, and wheel profile SBB32-3, which is used in preference in truck on train wagons with small wheel sets. Profiles with an extremely flat running surface are also known for achieving the flattest possible hunting movement.

The wheel profile S1002 is a profile that is adapted to a rail gradient of 1:40 and which is characterized in that during the wearing process it remains almost unchanged in shape over the running path, and varies only slightly in terms of its running characteristics. To this extent the profile S1002 may be regarded as a wearing profile. The flange angle of the wheel flange is 70°. The disadvantage of this profile is that it develops a slight difference in radius between the right and left wheel due to the minimal displacement in the wheel channel, particularly on rails with a built-in gradient of 1:20. This has a particularly negative effect in the case of running gears with non-self-steering axles, for example in Y25 bogies. Because of the absence of ΔR function, the wheel set is unable to develop sufficient steering force to force the bogie smoothly into the curve on contact with the wheel flange. As a result of contact with the wheel flange, jerking steering movements and hence high quasi-static transverse forces are experienced, which may easily exceed the limit values for route loading. This applies particularly to the negotiation of tight curves. A further disadvantage is the variable derivation of the ΔR function at a line gradient of 1:20.

The wheel profile SBB32-3 was developed specially for small wheel tread diameters, and again for truck on train wagons. In contrast to the profile S1002, it is characterized in particular by the steeper flank angle of 75° instead of 70°. The relevant area of the running surface has a flatter slope and hence a lower wheel tread difference than the profile S1002. The wheel flange width of 135 mm is identical to that of the S1002. The radius of 216 mm at entry into the slope of the wheel flange commences in the center of the measuring circle plane. After approx. 26 mm in the direction of the flange the radius of 216 mm passes into the radius of 17.7 mm, then passes into the radius of 13 mm after a further 7 mm. With a wheel flange thickness of 32.3 mm, the profile SBB32-3 also lies within the range of the profile S1002.

The disadvantage here is that in the case of the profile SBB32-3 there is hardly any self-controlling function of the wheel set because of the relatively small difference in radius between the right and left wheel due to the displacement of the wheel set in the wheel channel (ΔR function). A further disadvantage is the variable derivation of the ΔR function in the transition from the running surface to the wheel flange, which renders the use of larger wheel tread radius differences impossible. Because of the low conicity of the wheel profile, there is sufficient running stability in the straight line. The wheel profile is not dimensionally stable.

A further disadvantage of the above-mentioned wheel profiles lies in the fact that the Y/Q values are too high.

SUMMARY OF THE INVENTION

In one embodiment, the invention provides a wheel for goods wagons, with a measuring circle diameter of 330 mm to 760 mm, the wheel profile being defined by an inner wheel rim or tire front face, an inner wheel flange flank, a top of the wheel flange, an outer wheel flange flank, a groove of a running profile, a running surface, a gradient of an outer running surface section, an outer bevelling of the running profile, and an outer wheel rim or tire front face, wherein the wheel profile in the region of the groove of the running profile and of the running surface is described by the following coordinates ($X_{1\ to\ 4}$, $Y_{1\ to\ 4}$) in a solid coordinate system whose origin (x=0, y=0) lies in a measuring circle plane, which coordinates lie between the ranges of values indicated:

|  | $X_{max}$ | $X_{min}$ | Delta X |  | $Y_{max}$ | $Y_{min}$ | Delta Y |
|---|---|---|---|---|---|---|---|
| $X_1$ | −39.791 | −43.979 | 4.189 | $Y_1$ | 15.683 | 14.189 | 1.494 |
| $X_2$ | −29.109 | −32.173 | 3.064 | $Y_2$ | 3.823 | 3.459 | 0.364 |
| $X_3$ | −15.398 | −17.018 | 1.621 | $Y_3$ | 1.098 | 0.994 | 0.105 |
| $X_4$ | −4.042 | −4.468 | 0.426 | $Y_4$ | 0.223 | 0.201 | 0.021 |

In another embodiment, the invention provides a wheel for goods wagons with a measuring circle diameter of 760 mm to 1000 mm, having a wheel profile defined by an inner wheel rim or tire front face, an inner wheel flange flank, a top of the wheel flange, a outer wheel flange flank, a groove of a running profile, a running surface, an inclination of an outer running surface section, an outer bevelling of the running profile, and an outer wheel rim or tire front face, wherein the wheel profile in the region of the groove of the running profile and running surface is defined by the following coordinates ($X_{1\ to\ 4}$, $Y_{1\ to\ 4}$) in the solid coordinate system whose origin (x=0, y=0) lies in the measuring circle plane, which coordinates lie between the ranges of values indicated:

|   | $X_{max}$ | $X_{min}$ | Delta X |   | $Y_{max}$ | $Y_{min}$ | Delta Y |
| --- | --- | --- | --- | --- | --- | --- | --- |
| $X_1$ | −37.311 | −41.239 | 3.928 | $Y_1$ | 14.157 | 12.808 | 1.348 |
| $X_2$ | −27.028 | −29.873 | 2.845 | $Y_2$ | 3.693 | 3.341 | 0.352 |
| $X_3$ | −13.175 | −14.561 | 1.387 | $Y_3$ | 0.954 | 0.863 | 0.091 |
| $X_4$ | −2.342 | −2.589 | 0.247 | $Y_4$ | 0.129 | 0.117 | 0.012 |

The wheels according to the invention are intended in particular for wheel sets in running gears, which rely upon highly passive radial positioning when negotiating curves, and which must nevertheless remain stable at high speeds of travel. Because of the relatively large radius of entry into the transitional area from the running surface to the wheel flange, the wheel profile of the wheels is characterized by a low equivalent conicity. This provides quieter running of the wheel set whilst travelling in a straight line. In curves, however, there is sufficient wheel tread-differential.

This results in reduced wear and tear, particularly in regard to the wheel flange flanks. In the case of retreading it is not necessary to undercut as much volume as for conventional wheel profiles.

A decisive advantage of the wheel profile of the wheels according to the invention is that rails with gradients of both 1:20 and 1:40, but also rails with other gradients, can be negotiated to the optimum degree. The wheel profile contour selected, combined with the current rail profiles, e.g. UIC60, ensures continuous migrating wheel/rail contact points over a large area of the wheel profile during the transverse wheel set deflection. This also provides uniform wear reduction throughout the profile contour, i.e. the wheel profile shape of the wearing profile is more or less maintained.

For the wheel profile of the wheels according to the invention the design of the areas of the wheel profile which are described by the groove of the running profile and the running surface is a particularly decisive factor. The areas of the wheel profile which are described by the inclination of the outer running surface section and the outer bevelling of the running profile and by the outer wheel rim or tire front face may be designed steeper or flatter, depending on the existing superstructure conditions, such as switches, e.g. of a wing rail on a frog point, level crossings, pavement etc., and depending on the development of wearing of the wheel profile (e.g. incorrect wheel flange/hollow running).

BRIEF DESCRIPTION OF THE DRAWINGS

Two embodiments of the invention are described in detail in the following with reference to the drawing figures.

FIGS. 2*a* to 2*c* show the profile description of the wheel profile in FIG. 1 in the solid coordinate system, including the radii of the circle segments describing the profile, FIGS. 4*a* to 4*c* show the profile description of the wheel profile in FIG. 3 in the solid coordinate system, including the radii of the circle segments.

DETAILED DESCRIPTION

Figure 1A:
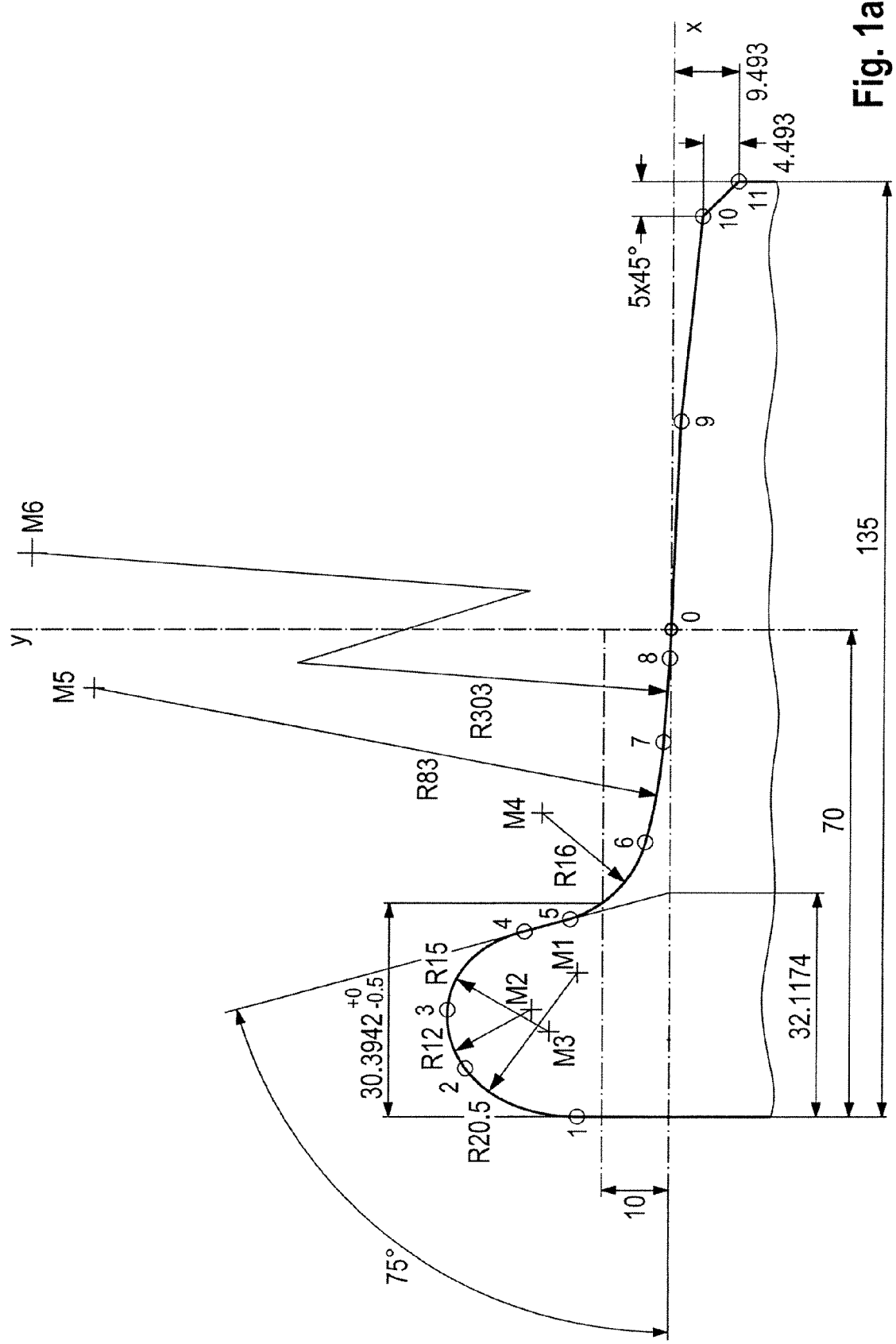
FIG. 1 shows the wheel profile of a wheel for goods wagons with a small wheel diameter.
Figure 1B:
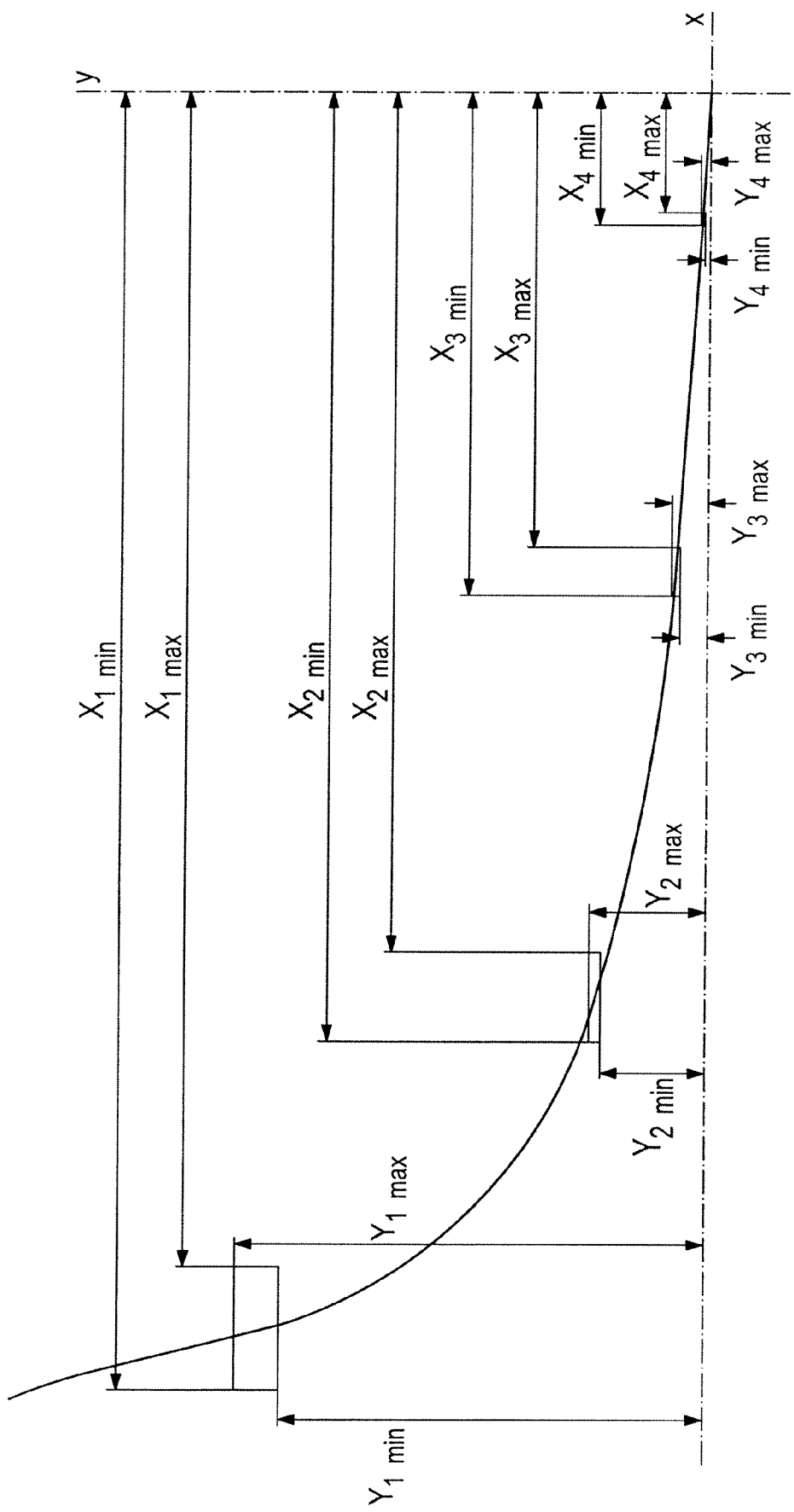
Figure 1C:
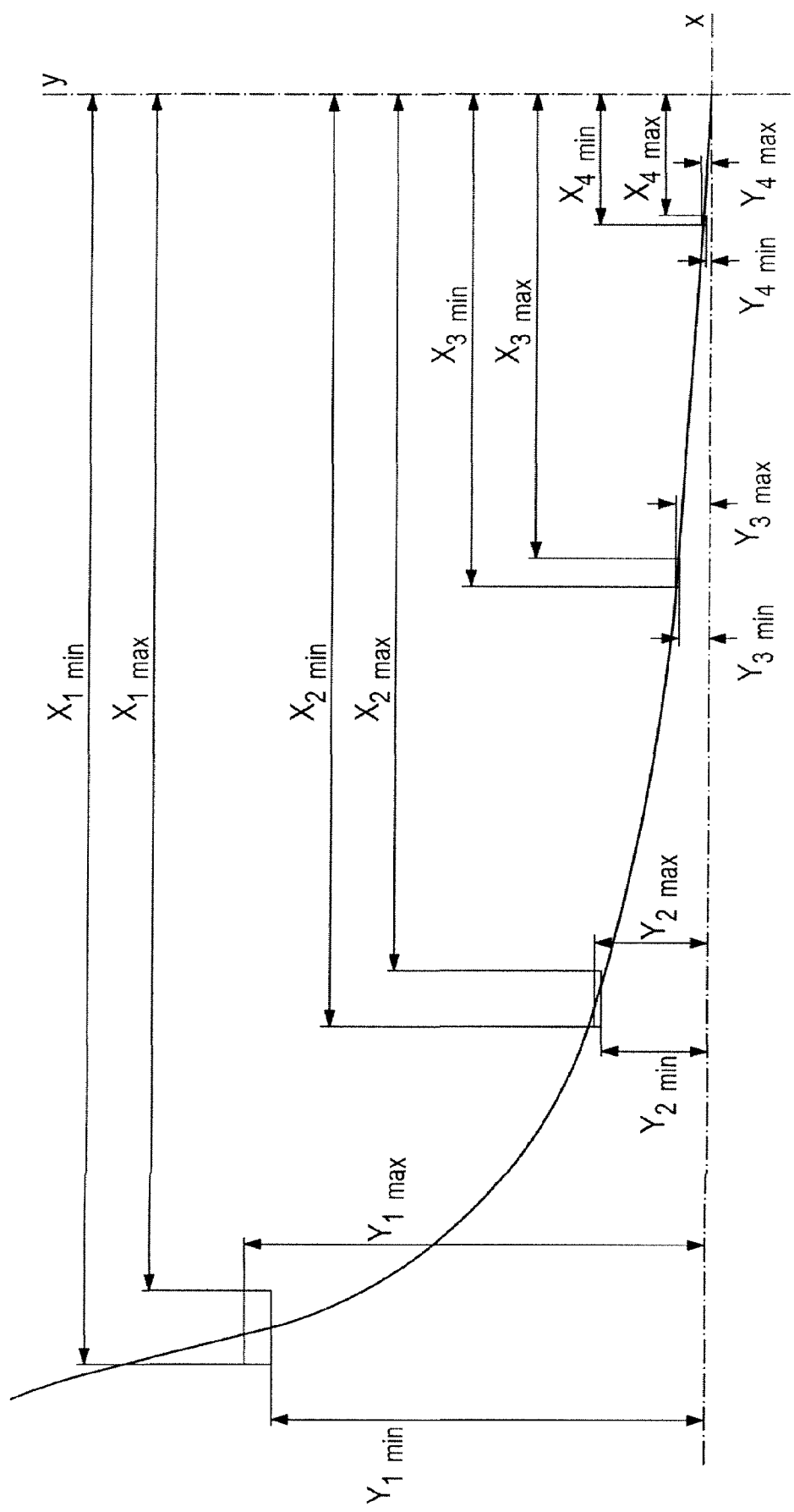

FIG. 1 illustrates the wheel profile for wheels with a small diameter, which is characteristic of small wheels with a diameter of 330-760 mm. FIG. 2*a* shows, in tabular form, the individual coordinates and radii of an optimum profile for a diameter of 330-760 mm, in particular 380 mm, which the inventors have developed in a large number of tests and simulations, whilst FIGS. 2*b* and 2*c* indicate ranges of values for the coordinates and radii. It has been shown that the advantages of the invention still pertain when the coordinates lie within the ranges of values indicated in FIGS. 2*b* and 2*c*.

The wheel profile for small wheels is described by ten ranges, each of which lies between points 1 to 11. The profile is described in the solid coordinate system, whose origin (y=0, z=0) lies in the measuring circle plane (750 mm from the central wheel set plane). The wheel profile described is determined for wheel sets which have a wheel size that must be adhered to according to the international regulations (RIC, RIV, UIC), particularly for a wheel size of between 14.21 and 14.26 mm.

The areas of the wheel profile that lie between points 1 and 2, 2 and 3, 3 and 4, 5 and 6, 6 and 7 and 7 and 8 are described by circle segments, which are formed from circles with the centers M1 to M6 and radii R indicated. The circle segments with the indicated centers and radii pass continuously into each other, i.e. there are no variabilities at the points.

The radii M4, M5 and M6, which describe the circle segments between points 5 and 6, 6 and 7 and 7 and 8, are particularly decisive for the advantageous running characteristics. These areas lie in the groove of the running profile and running surface.

Radius R16 of the circle about center M4 lies in a tolerance range of between 15 mm and 18 mm, and runs into the flank area of the wheel flange at a distance of 30 mm to 32 mm measured from the point of wheel loading on the wheel flange. Radius R83 about center M5 lies in a tolerance range of 80 mm to 84 mm, in which the centers vary accordingly. Radius R303 about center M6 lies in a tolerance range of between 300 and 305 mm, and commences at a point from 4 mm to 6 mm from the center of the measuring circle, in which the centers vary accordingly. In the preferred embodiment the radii are 16 mm, 83 mm, and 303 mm.

The profile area between points 4 and 5 is described by a straight-line which intersects the x axis at an angle of 75° (angle of the outer wheel flange flank). However, the flank angle may also be below 70°.

Because of the relatively large radius R 303 about center M6, in the range of 300 to 305 mm, and because of the connecting radii about centers M5 and M4 of 80 to 84 mm and 15 to 18 mm respectively, combined with a reduced wheel size, a lower equivalent conicity is obtained when the wheel sets run out onto a straight line. On entering tight curves there is a relatively steep rise in the wheel profile contour where the wheel comes into contact with the wheel set at approximately 16 mm from the center of the measuring circle (diameter), viewed in the direction of the flange flank, this being due to the relatively small radius ranging from 80 to 84 mm about center M5. Therefore a sufficiently large ΔR function is generated to provide the wheel set, whilst running in curves, a correspondingly large setting moment due to the tangential longitudinal slip throughout the rail gradient range of 1:20 to 1:40 and beyond. The radius about center M4 (15 mm to 18 mm) connecting to the radius about center M5(80 mm to 84 mm), on the transition to the flank surface inclined at 75°, is therefore larger than in the wheel profiles of prior art. When the wheel flange is contacted, a smoother behavior, without impact, is guaranteed. Consequently this area, with rail profile UIC60 (gradient 1:20 and 1:40) experiences a "more constant" first derivation of the ΔR function. Therefore there can be no two-point contacts between the wheel tire profile and the rail profile either.

When entering curves, the relatively small radius R 83 about center M5, which connects to radius R 303 about center M6, results in a steep increase in the ΔR function if the wheel flange comes into contact with the rail head. This in turn results in a positive steering moment of the wheel set, and hence to better radial setting of the wheel set. Radius R16, connecting to radius R83, at the transition to the flank surface inclined at 75°, allows smooth contact, without impact, between the wheel flange and the rail head if there are any irregularities in the curving of the rail that may occur in the case of major track defects. The slightly higher equivalent conicity resulting from the higher ΔR function when negotiating curves presents no problem because tight curves are negotiated at lower speeds, and stable running conforming to the predetermined routing is achieved because of the centrifugal force of the goods wagon.

Figure 3A:
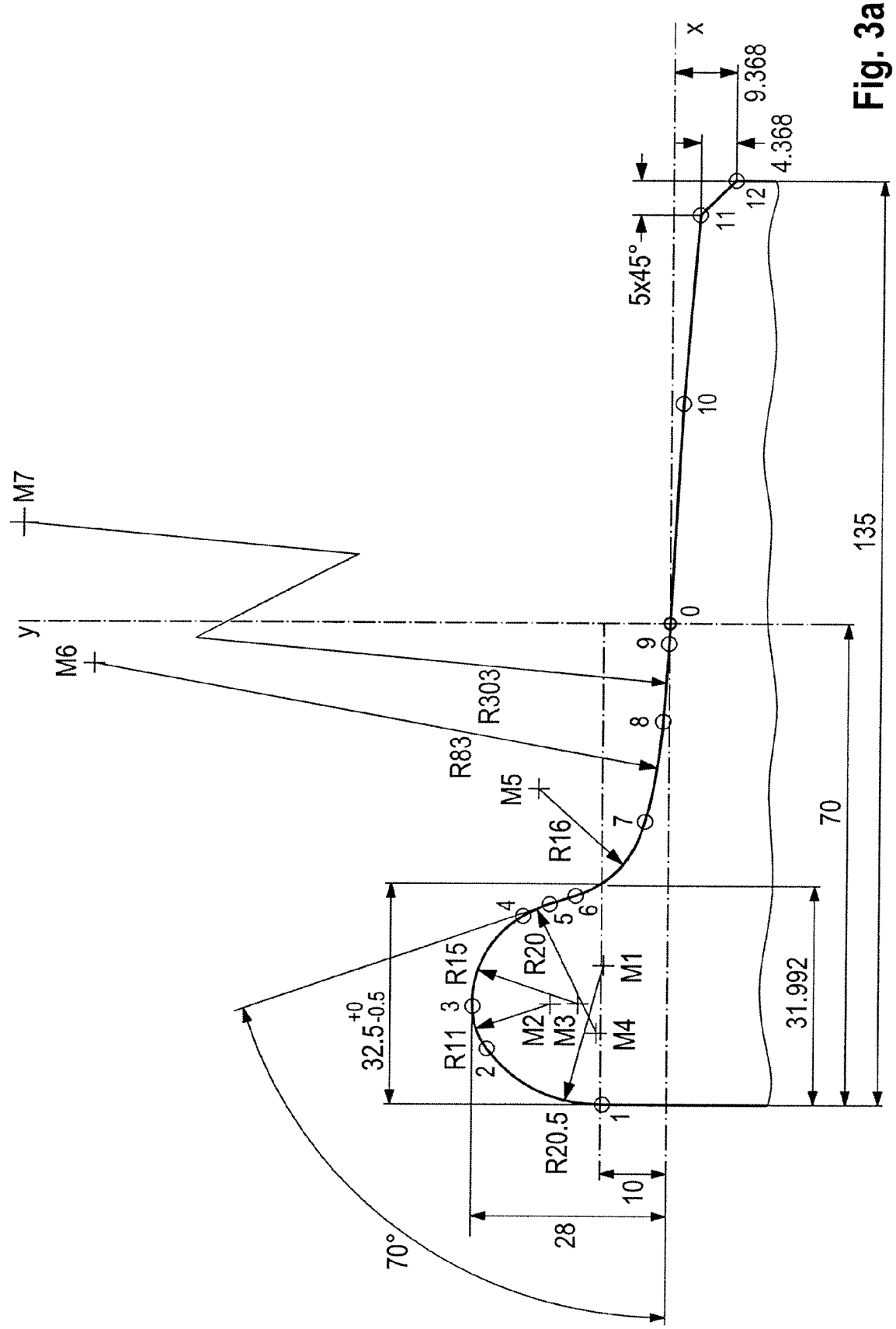
FIG. 3 shows the wheel profile for wheels with a large diameter.
Figure 3B:
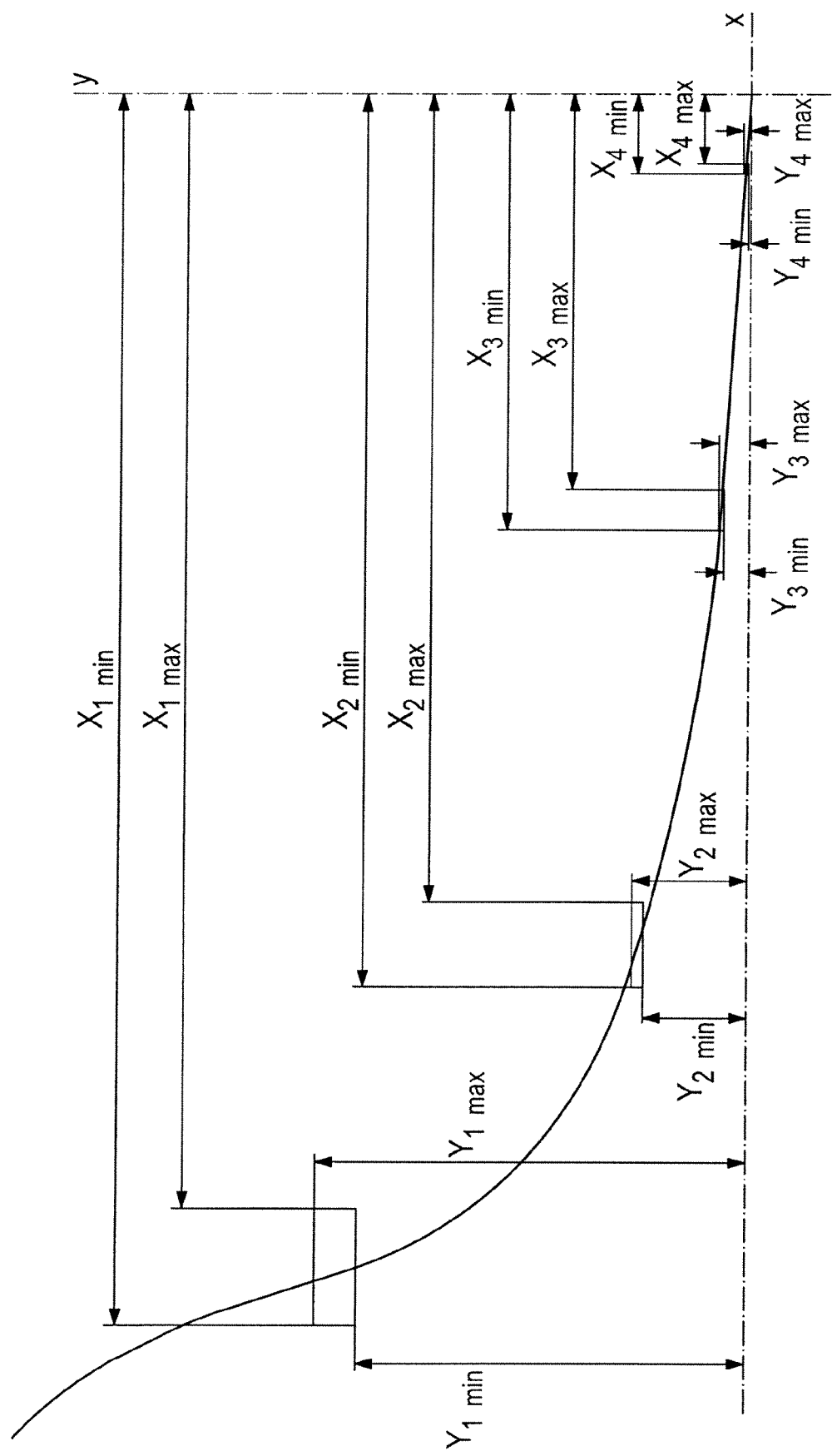
Figure 3C:
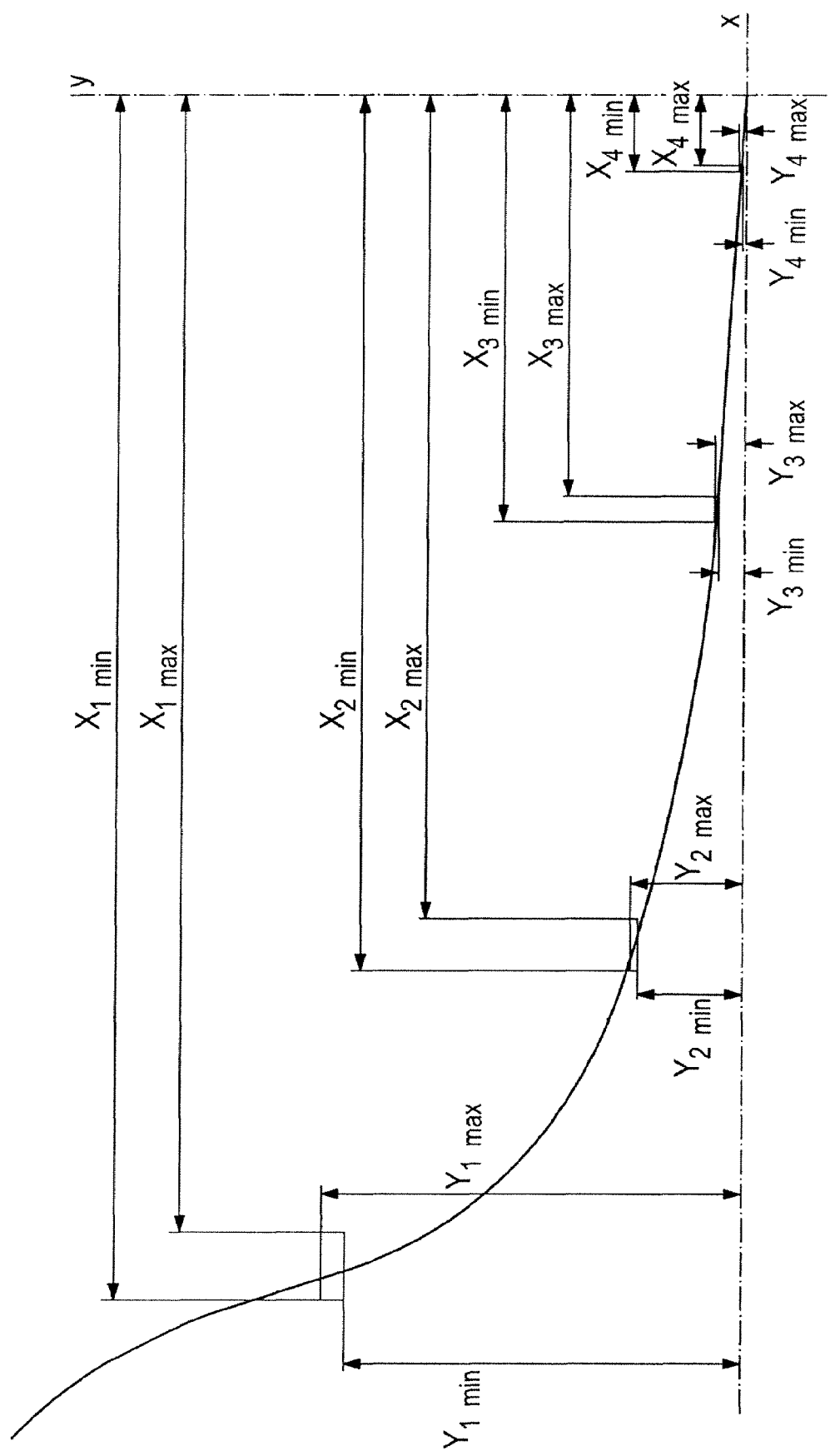

FIG. 3 illustrates the wheel profile for large wheels with a large diameter, which is characteristic of wheels with diameters ranging from 760-1000 mm, in particular 920 mm. FIG. 4a shows, in tabular form, the individual coordinates and radii of an optimum profile for a diameter of 920 mm, which the inventors have developed in a large number of tests and simulations, whilst FIGS. 4b and 4c indicate ranges of values for the coordinates and radii. It has been shown that the advantages of the invention are enjoyed even when the coordinates lie within the ranges of values indicated in FIGS. 4b and 4c.

Because of the larger diameter, values other than those for the wheel profile for small wheels, described with reference to FIGS. 1 and 2a to 2c, are obtained for the coordinates of the points and radii. Here too the ranges of wheel profile between points 6 and 7, 7 and 8 and 8 and 9, which are described by the circles of radii M5, M6 and M7, are particularly decisive.

Radius R16 of the circle about center M5 lies within a tolerance range of between 15 and 18 mm, and runs into the flank surface of the wheel flange at a distance of 36 to 39 mm, measured from the point of pressure between the wheel and wheel flange. Radius R83 about center M6 lies within a tolerance range of between 80 and 84 mm, in which the centers then vary accordingly. Radius R303 about center M7 lies within a tolerance range of between 300 and 305 mm, and commences from 1 to 2 mm from the center of the measuring circle, in which the centers then vary accordingly. In the preferred embodiment the radii are 16, 83 and 303 mm. In contrast to the embodiment shown in FIGS. 1 and 2, the angle of the outer wheel flange flank between points 5 and 6 is 70°.

When entering tight curves there is a relatively steep increase in the wheel profile contour when the wheel contacts the wheel set at only approximately 13 mm from the center of the measuring circle, viewed in the direction of the flange flank. If the coordinates of points 6, 7, 8 and 9 in particular lie within the ranges of values indicated, the same advantages described with reference to FIGS. 1 and 2a to 2c for smaller wheels are also provided for larger wheels.

In this regard reference is therefore made to the description of the first embodiment.

The invention claimed is:

1. Wheel for goods wagons, with a measuring circle diameter of 330 mm to 760 mm, having a wheel profile defined by an inner wheel rim or tire front face, an inner wheel flange flank, a top of the wheel flange, an outer wheel flange flank, a groove of a running profile, a running surface, a gradient of an outer running surface section, an outer bevelling of the running profile, and an outer wheel rim or tire front face, wherein the wheel profile in the region of the groove of the running profile and of the running surface is described by the following coordinates ($X_{1\ to\ 4}, Y_{1\ to\ 4}$) in a solid coordinate system whose origin (x=0, y=0) lies in a measuring circle plane, which coordinates lie between the ranges of values indicated:

|  | $X_{max}$ | $X_{min}$ | Delta X |  | $Y_{max}$ | $Y_{min}$ | Delta Y |
|---|---|---|---|---|---|---|---|
| $X_1$ | −39.791 | −43.979 | 4.189 | $Y_1$ | 15.683 | 14.189 | 1.494 |
| $X_2$ | −29.109 | −32.173 | 3.064 | $Y_2$ | 3.823 | 3.459 | 0.364 |
| $X_3$ | −15.398 | −17.018 | 1.621 | $Y_3$ | 1.098 | 0.994 | 0.105 |
| $X_4$ | −4.042 | −4.468 | 0.426 | $Y_4$ | 0.223 | 0.201 | 0.021. |

2. Wheel according to claim 1, wherein the wheel profile in the region of the groove of the running profile and running surface is described by the following coordinates ($X_{1\ to\ 4}, Y_{1\ to\ 4}$) in the solid coordinate system, which coordinates lie between the ranges of values indicated:

|  | $X_{max}$ | $X_{min}$ | Delta X |  | $Y_{max}$ | $Y_{min}$ | Delta Y |
|---|---|---|---|---|---|---|---|
| $X_1$ | −40.628 | −43.142 | 2.513 | $Y_1$ | 15.384 | 14.488 | 0.896 |
| $X_2$ | −29.722 | −31.560 | 1.838 | $Y_2$ | 3.750 | 3.532 | 0.218 |
| $X_3$ | −15.722 | −16.694 | 0.972 | $Y_3$ | 1.077 | 1.015 | 0.063 |
| $X_4$ | −4.127 | −4.383 | 0.255 | $Y_4$ | 0.218 | 0.206 | 0.013. |

3. Wheel according to claim 1, wherein areas of the wheel profile lying between the individual coordinates are described by circle segments, wherein the course of the profile between the circle segments is constant.

4. Wheel according to claim 1, wherein the groove of the running profile is described by a circle segment whose radius is between 15 mm and 18 mm.

5. Wheel according to claim 1, wherein an area of the running surface which is described by a circle segment whose radius is between 80 mm and 84 mm connects to the groove of the running profile.

6. Wheel according to claim 5, wherein an area adjoining the area of the running surface which adjoins the groove of the running profile connects to an area which is described by a circle segment whose radius is between 300 mm and 305 mm.

7. Wheel set with wheels according to claim 1, wherein the wheel set has a wheel size which is between 1420 mm and 1425 mm.

8. Wheel for goods wagons with a measuring circle diameter of 760 mm to 1000 mm, having a wheel profile defined by an inner wheel rim or tire front face, an inner wheel flange flank, a top of the wheel flange, a outer wheel flange flank, a groove of a running profile, a running surface, an inclination of an outer running surface section, an outer bevelling of the running profile, and an outer wheel rim or tire front face, wherein the wheel profile in the region of the groove of the running profile and running surface is defined by the following coordinates ($X_{1\ to\ 4}, Y_{1\ to\ 4}$) in the solid coordinate system whose origin (x=0, y=0) lies in the measuring circle plane, which coordinates lie between the ranges of values indicated:

|  | $X_{max}$ | $X_{min}$ | Delta X |  | $Y_{max}$ | $Y_{min}$ | Delta Y |
|---|---|---|---|---|---|---|---|
| $X_1$ | −37.311 | −41.239 | 3.928 | $Y_1$ | 14.157 | 12.808 | 1.348 |
| $X_2$ | −27.028 | −29.873 | 2.845 | $Y_2$ | 3.693 | 3.341 | 0.352 |
| $X_3$ | −13.175 | −14.561 | 1.387 | $Y_3$ | 0.954 | 0.863 | 0.091 |
| $X_4$ | −2.342 | −2.589 | 0.247 | $Y_4$ | 0.129 | 0.117 | 0.012. |

9. Wheel according to claim 8, wherein the wheel profile in the region of the groove of the running profile and running surface is described by the following coordinates ($X_{1\ to\ 4}$, $Y_{1 \, to \, 4}$) in the solid coordinate system, which coordinates lie between the ranges of values indicted:

|   | $X_{max}$ | $X_{min}$ | Delta X |   | $Y_{max}$ | $Y_{min}$ | Delta Y |
|---|---|---|---|---|---|---|---|
| $X_1$ | −38.097 | −40.453 | 2.357 | $Y_1$ | 13.887 | 13.078 | 0.809 |
| $X_2$ | −27.597 | −29.304 | 1.707 | $Y_2$ | 3.623 | 3.411 | 0.211 |
| $X_3$ | −13.452 | −14.284 | 0.832 | $Y_3$ | 0.936 | 0.881 | 0.055 |
| $X_4$ | −2.392 | −2.539 | 0.148 | $Y_4$ | 0.127 | 0.120 | 0.007. |

10. Wheel according to claim 8, wherein areas of the wheel profile lying between the individual coordinates are described by circle segments, wherein the course of the profile between the circle segments is constant.

11. Wheel according to claim 8, wherein the groove of the running profile is described by a circle segment whose radius is between 15 mm and 18 mm.

12. Wheel according to claim 8, wherein an area of the running surface, which is described by a circle segment whose radius is between 80 mm and 84 mm, is connected to the groove of the running profile.

13. Wheel according to claim 12, wherein an area adjoining the area of the running surface which adjoins the groove of the running profile connects to an area which is described by a circle segment whose radius is between 300 m and 305 mm.

14. Wheel set with wheels according to claim 8, wherein the wheel set has a wheel size which is between 1420 mm and 1425 mm.

15. Wheel set according to claim 1, the measuring circle diameters is 380 mm.

16. Wheel According to claim 8, wherein the measuring circle diameter is 920 mm.

\* \* \* \* \*